Aug. 29, 1950     C. K. POWELL     2,520,610
EGG CANDLING MACHINE

Filed July 7, 1948     4 Sheets-Sheet 1

INVENTOR.
CHARLES K. POWELL
BY
Campbell, Brumbaugh, Free & Graves
HIS ATTORNEYS.

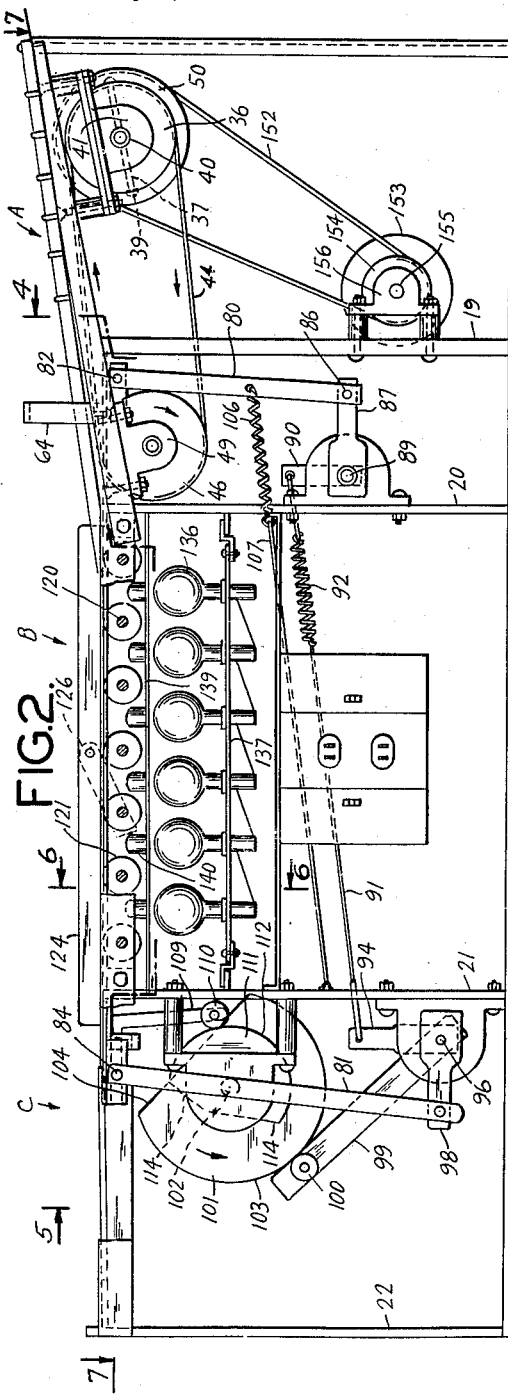

Aug. 29, 1950 C. K. POWELL 2,520,610
EGG CANDLING MACHINE
Filed July 7, 1948 4 Sheets-Sheet 3

INVENTOR.
CHARLES K. POWELL
BY
Campbell, Brumbaugh, Free & Graves
HIS ATTORNEYS.

Aug. 29, 1950 — C. K. POWELL — 2,520,610
EGG CANDLING MACHINE
Filed July 7, 1948 — 4 Sheets-Sheet 4

INVENTOR.
CHARLES K. POWELL
BY
Campbell, Brumbaugh, Free & Graves
HIS ATTORNEYS.

Patented Aug. 29, 1950

2,520,610

UNITED STATES PATENT OFFICE 2,520,610

EGG CANDLING MACHINE

Charles K. Powell, Washington, D. C., assignor to Chestnut Farms-Chevy Chase Dairy Company, Washington, D. C., a corporation of Delaware Application July 7, 1948, Serial No. 37,442

3 Claims. (Cl. 88—14.5)

The invention relates to machines for inspecting objects by transmitted light, and more particularly to devices used in inspecting eggs, which devices are known as "candling" machines.

In the past it has been the practice to inspect or "candle" eggs by placing them on a belt or conveyor and moving them continuously over an illuminated area. When the light shines through the eggs, any imperfections therein, such as blood spots, cracks, etc., are revealed to an operator who then removes the faulty egg. In such an arrangement, it is necessary for the operator to watch eggs in continuous translational motion across a brightly illuminated area. The shining of a light into the operator's eyes coupled with the inherent difficulty of constantly and simultaneously observing a number of moving objects materially reduces the speed at which eggs may be candled efficiently.

In order that all the imperfections in an egg may be observed, it is necessary that it be viewed in various rotational positions. This is necessary because an imperfection may show as a shadow when the egg is in one position and may not be visible when it is rotated 90° about its longitudinal axis. Hence, it has been common in previous egg-candling machines to provide means for rotating the eggs as they move across the illuminated area. However, since the rotation was continuous, the operator was at the same disadvantage he was at with regard to the translational motion of the eggs across the illuminated area. The observation of the continuously rotating egg proved tiring and difficult to perform efficiently over extended periods of time.

Among the objects of this invention is the increasing of the speed and efficiency of egg-candling through the elimination of continuous motion of the eggs and the substitution therefor of translational and rotational motion that is intermittent, thereby making it less tiring for the operator to observe for longer periods of time.

Another object of the invention is to provide a machine that will rotate an egg on its own axis while said axis is stationary and then cease rotating it to permit continued observation of the egg while only the contents within the shell continue to rotate.

Other objects of the invention will be in part apparent and in part pointed out later.

The objects of the invention are achieved by providing a bank of electric lamps set in a horizontal plane with a rack adapted for holding eggs above these lamps. For each viewing position on the rack where an egg is held, there is a corresponding lamp below it. Eggs are fed to the rack from a feeding system and fit into specially shaped recesses adapted to carry them. The rack, operated by an arrangement of springs and levers, lowers the eggs onto rollers positioned above the lamps. These rollers turn the eggs through part of a revolution and operate intermittently so that an opportunity is afforded the operator to observe the egg both before and after it is rotated. The rack then moves upward and engages the eggs, lifting them off the rollers. A forward movement of the rack carries the eggs over one or more sets of rollers to positions over another row of lamps and lowers them to the corresponding rollers. The rack then moves back to its original position thus completing the cycle. Thus, when viewed from the side, the movement of the rack follows a substantially rectangular path: up, forward, down and back. The egg is moved forward to a new position at each rectangular movement of the rack and positioned differently about its longitudinal axis so that the operator may see the egg while it is stationary in a plurality of positions. Since the eggs are substantially stationary during half of the rack's cycle of motion, there is adequate opportunity to inspect them carefully not only while the shell turns but also after the shell has stopped turning and the contents thereof keep turning. Since each egg is moved intermittently, it is in a different position during each stationary period, making it possible to detect an imperfection which may be noticed in one position but which might not be detected in another if the eggs were moved continuously.

For a more detailed description of the invention, reference may be had to the accompanying drawings, in which:

Figure 2 is a side elevation of the complete machine illustrated in Figure 1;

Figure 3 is a sectional view taken on line 3—3 of Figure 1;

Figure 1:
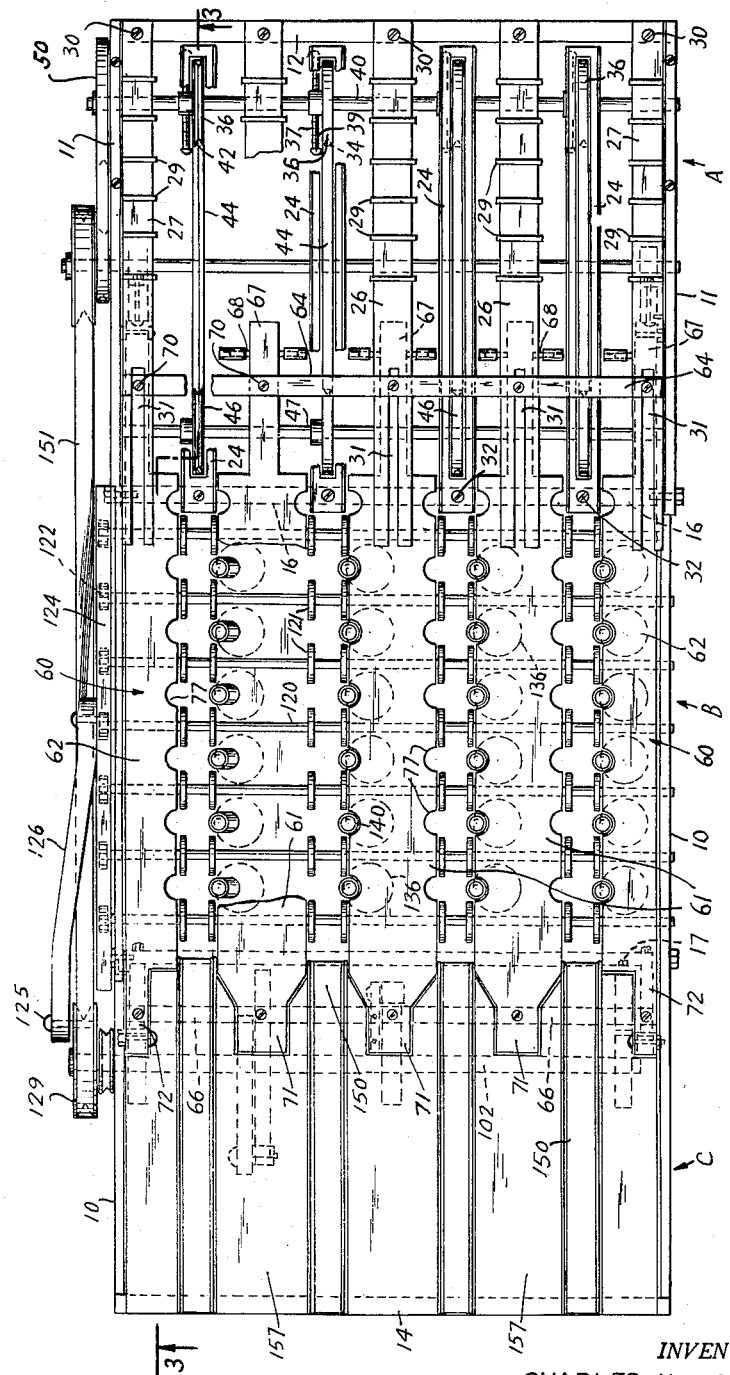
Figure 1 is a plan view of one embodiment of the complete machine comprising the feed, candling and delivery sections.

The embodiment of the egg candling machine of this invention illustrated in the drawing includes a feed section A, a viewing or candling section B, and a delivery section C. The three sections lie within a stationary rectangular frame consisting of side frame members 10 and 11, end frame members 12 and 14 and transverse frame members 16 and 17. The machine is supported at a suitable distance above the floor by means of upright frame members 18, 19, 20, 21 and 22.

The feed section A of the machine is encompassed by end frame 12, two inclined side frame members 11 and transverse frame member 16.

Figure 4:
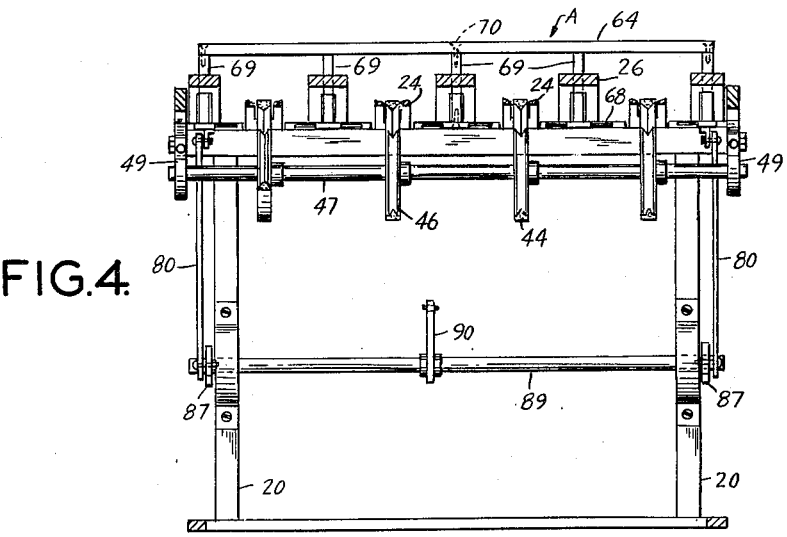
Figure 4 is a sectional view taken on line 4—4 of Figure 2.

As shown in Figures 2 and 3, the top of the feed section A slopes downwardly toward the candling section B. Referring now to Figures 1 and 4, the top of the feed section A includes four track sections 24 of two tracks each, three partitions 26 separating the four track sections 24 and a pair of oppositely disposed guard members 27 adjacent the sloping side frame members 11. The three partitions 26 and the two guard members 27 are each provided with a plurality of projecting obstructions 29. The rear ends of partitions 26 and guard members 27 are supported by the end frame member 12 and attached loosely thereto for limited vertical rotational movement by means of screws 30 or the like. The forward ends of the partitions 26 and the guard members 27 rest on a candling rack 60 and are bifurcated at 31 to provide means for relative motion between the partitions 26 and guard members 27 and spacers 69 connecting extensions 67 of the candling rack 60 with a cross brace 64 to be more specifically described hereinafter.

The forward ends of the track sections 24 are loosely attached to the transverse frame member 16 by means of screws 32 or the like to permit limited vertical movement of the rear ends which are provided with depending extensions 33 that rest upon a support 34 attached to upright frame members 18. Four pulleys 36 are each provided with a pair of set screws 37, the heads 39 of which project to such an extent that with each revolution of the pulleys 36, each of the track sections 24 will twice be moved upwardly at the rear end of the machine.

The pulleys 36 are mounted on a shaft 40, each end of which is mounted for rotation in a journal bearing 41 secured to a side frame member 11 as shown. The pulleys are provided with a centrally grooved section 42 adapted to receive a belt 44 passing over grooved pulleys 46 mounted on a shaft 47 supported in journals 49. The normal level of the track sections 24, i. e., when the heads 39 of the set screws 37 are not in engagement therewith, the width of the track sections and the level of the top of the belt 44 are so adjusted that an egg resting on the track with its longest axis horizontal and transverse of the track will be subjected to a minimum amount of friction by the belt and an egg in any other position would be subjected to the maximum amount of friction. The pulleys 36 and 46 and the belts 44 are driven, in the direction indicated by the arrows, by a belt arrangement to be described more specifically hereinafter acting on pulley 50 secured to one end of the shaft 40.

The candling section B of the machine includes a candling rack 60 composed of three central sections 61 and two side sections 62 maintained in fixed spatial relation to one another as shown in Figure 1 by means of transverse brace members 64 and 66. The rear ends of the central and side sections 61 and 62, respectively, are provided with extensions 67 fastened to the transverse brace 64 by means of spacers 69 and screws 70. They are also provided with projections 68 as shown in Figure 1. The projections 68 are preferably rod sections covered with rubber tubing that extends almost to the adjacent side of the track section 24. The forward ends of the rack sections 61 and 62 are provided with extensions 71 and 72, respectively, attached to the transverse brace 66 by means of spacers 74 and screws 76. Both sides of the rack sections 61 and one side of each side section 62 have a plurality of oppositely disposed recesses 77, each oppositely disposed pair of recesses being adapted to support one egg.

The candling rack 60, which is shown in its rearward and lower position in all the figures, is mounted for movement upwardly, forwardly, downwardly and rearwardly upon upright lever members 80, 81 and 81a, one pair of members 80 being pivotally connected to the two outside extensions 67 at 82 and the other two upright lever members 81 and 81a being pivotally connected to the two outside extensions 72 of the rack 60 at 84. The upright lever members 80 at the feed end are pivotally attached at 86 to levers 87 fixedly secured to a shaft 89, which has mounted thereon a lever member 90 connected by a tension rod 91 and coil spring 92 to a lever 94 fixedly secured to a shaft 96 supported on upright frame member 21. The other pair of upright lever members 81 and 81a is pivotally attached to levers 98 likewise fixedly secured to shaft 96. A cam arm 99 fixedly secured to shaft 96 and provided at the other end with a cam follower 100 engages with a cam 101 mounted on a cam shaft 102 and having a peripheral cam face 103 and a flattened cam face 104.

At a point intermediate the pivot connections 82 and 86 of upright lever members 80, there is secured a coil spring 106 and a tension rod 107 attached to the upright frame member 21. An arm 109 fixed to and depending from the rack 60 at the delivery end of the rack is provided with a cam follower 110 in engagement with a second cam 111 mounted on cam shaft 102 and having a peripheral cam surface 112 and a flattened cam surface 114.

The flattened cam surfaces 104 and 114 of the cams 101 and 111, respectively, are disposed relative to one another in such a manner that when the rack 60 is at its lowermost and rearmost position, the cam follower 100 will be the first to engage the surface 104 of the cam 101 so that the tensioning force of the coil spring 92 will cause the lever 94 to rotate in a clockwise direction and the lever 90 in a counterclockwise direction. These motions are transmitted to the pairs of levers 98 and 87 so as to move the upright lever members 81 and 80 upwardly to lift the rack.

After the rack 60 has begun moving upwardly, the cam follower 110 reaches the flattened cam surface 114 of the cam 111 and is constrained, by the tensile force exerted by coil spring 106, to follow the said flattened surface with the result that the upright lever members 80 and 81 will be rotated in a counterclockwise direction and the rack 60 will be moved forwardly, i. e., toward the delivery end of the machine while the rack is raised from its lowermost position.

As the cam follower 110 approaches the midpoint of the flattened cam surface 114, the cam follower 100 also approaches the midpoint of the flattened cam surface 104 so that the forward movement of the rack 60 will be halted and the downward movement thereof can begin. When the downward movement has been substantially completed, that is, when the cam follower 100 reaches the end of the cam surface 104, the cam follower 110 will begin to traverse the second half of the flattened cam surface 114 so as to force movement of the rack 60 toward the feed section against the action of coil spring 106. When the cam follower 110 reaches the end of the flattened cam surface 114, both cam followers 100 and 110 will be engaged by the peripheral cam surfaces 103 and 112, respectively, so that no motion of the rack 60 will take place until the cam follower 100 again reaches the flat surface 104 of the cam 101.

Figure 5:
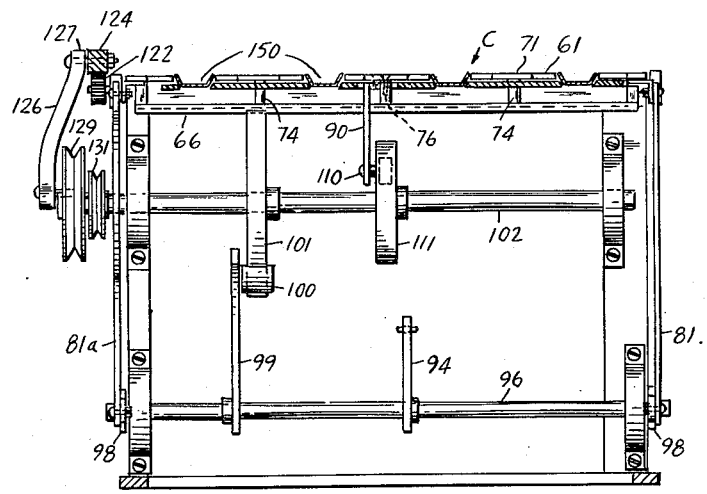
Figure 5 is a sectional view taken on line 5—5 of Figure 2.
Figure 6:
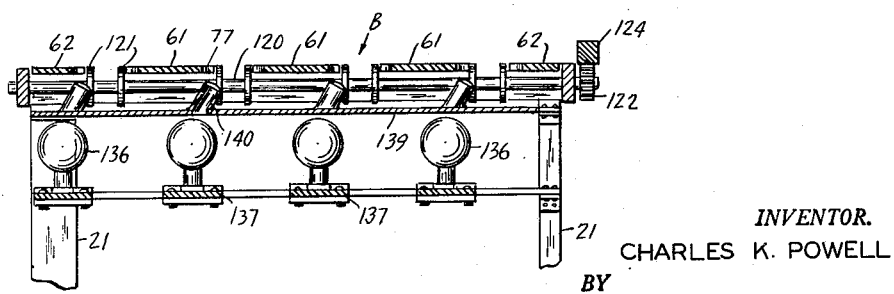
Figure 6 is a sectional view taken on line 6—6 of Figure 2.
Figure 7:
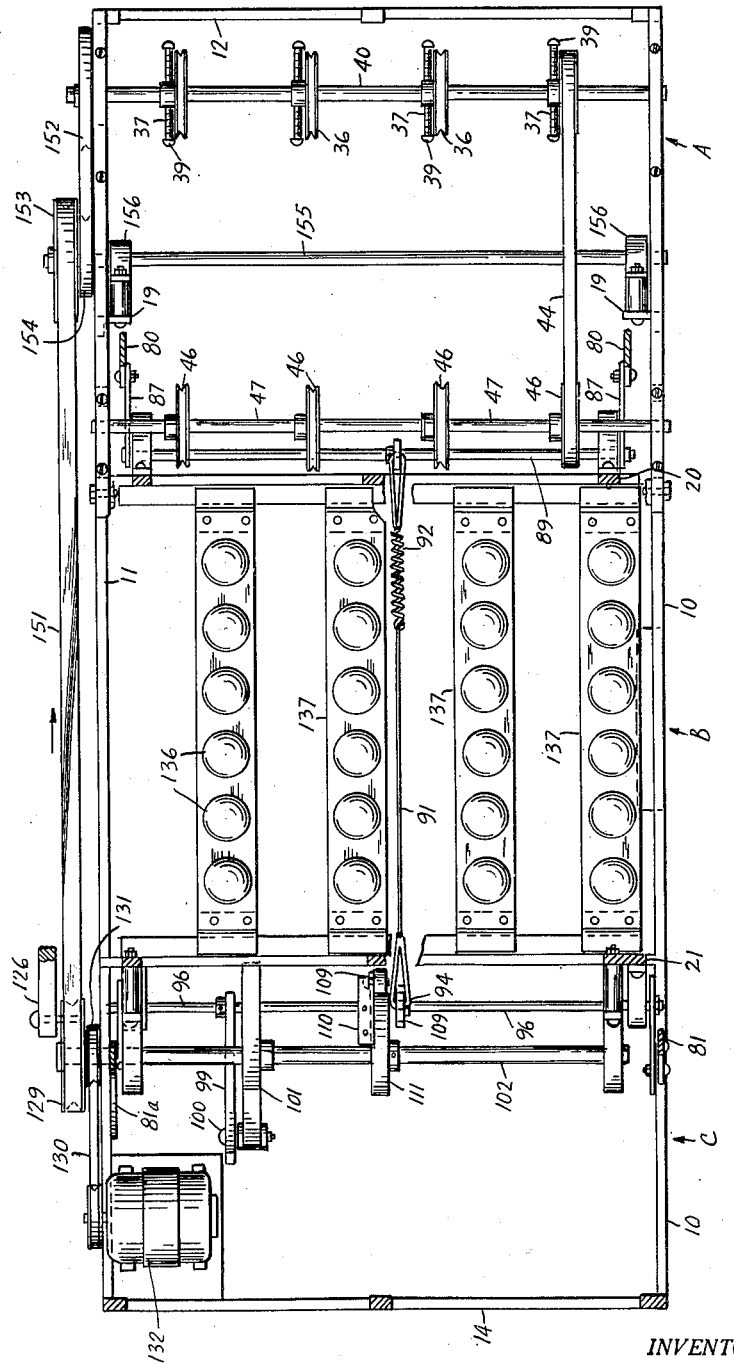
Figure 7 is a sectional view taken on line 7—7 of Figure 2 with the belts removed.

Immediately under the candling rack 60, as best seen in Figures 1, 2, 3 and 6, there are provided seven transverse shafts 120, each shaft having four pairs of disc rollers 121 and secured to one end a gear 122 in mesh with a gear rack 124 at the drive side of the machine as best shown in Figure 5. The gear rack 124 is mounted for reciprocating motion on the gears 122 and driven by a rod 126 pivotally attached to the gear rack 124 by means of nut and bolt connection 127 and eccentrically and slidably attached to the pulley 129 by means of a bolt 125 slidable in a slot 128. The pulley 129 is mounted on the cam shaft 102 which is driven by a belt 130 engaging the pulley 131 on the cam shaft 102, said belt 130 being driven by a motor 132.

Mounted below the transverse shafts 120 and the gear rack 124 are four rows of lamps 136, six lamps in each row. Each row of lamps is mounted on a support 137 secured by appropriate means to the upright frame members 20 and 21. Immediately above the lamps 136 there is mounted a light shield 139 (see Figures 2 and 6) provided with a tilted focusing tube 140 for each lamp 136. In the preferred embodiment, the lamps 136 are of the type that emit a relatively narrow beam of light which can be directed easily.

The delivery section C of the machine includes four tracks 150 having a slightly downward tilt, as shown in Figures 2 and 3, so that the eggs will roll slowly down the incline.

In operation, the machine is set into motion by the motor 132 which, by way of belt 130 and pulley 131, sets into counterclockwise rotation, as seen in Figures 2 and 3, the cam shaft 102, the cams 101 and 111 and pulleys 129 and 131 mounted thereon. The rotation of the cam 101 in cooperation with the tensile force of the coil spring 92 and the cam follower 100 operates to periodically raise and lower the rack 60 by means of levers 87 and 90 which actuate upright lever member 80 and levers 94 and 98 which actuate upright lever members 81. The rotation of the cam 111 in cooperation with the coil spring 106 and the cam follower 110 operate periodically to move the rack forwardly and rearwardly. The rotation of pulley 129 on cam shaft 102 actuates the rod 126 to impart an intermittent reciprocating motion to the gear rack 124. The slot connection of the rod 126 to the pulley 129 and the angular relationship thereto of the cam surfaces 104 and 114 are such as to rotate the disc rollers 121 on the transverse shaft 120 at one distinct interval while the candling rack 60 is in its lowermost position.

Pulleys 153 and 154 are mounted on shaft 155 which is journaled in a bearing 156 mounted on support 19. The belt connections 130, 151 and 152 between pulleys 129, 153, 154 and 50 operate to move the friction belts 44 within the track sections 24 in a rearwardly direction and the projecting heads 39 of the set screws 37 operate to momentarily lift the rear ends of the track sections 24 twice during each revolution of the pulleys 36.

The eggs to be candled are placed on the track sections 24 and permitted to move down the incline to the last position on the track sections, i. e., over the first sets of recesses 77. The intermittent lifting of the rearmost track sections 24, the rearward motion of the belts 44 within the track sections 24 and the obstructions 29 on the partitions 26 and the side guard members 27 all cooperate to line the eggs up so that all of them will have their longest axes substantially horizontal and transverse relative to the track sections 24. The motion of the candling rack 60 to which the projections 68 are attached operates to push the eggs along the track sections 24 during the forward motion of the candling rack 60.

As the candling rack 60 repeats its cycle of movement upwardly, forwardly and downwardly, the eggs in the first pairs of recesses 77 are deposited upon and between the first set of discs 121 mounted on transverse shafts 120. Further downward motion of the candling rack 60 disengages the eggs from the recesses 77 and permits the candling rack 60 to move rearwardly without moving the eggs.

At the moment the eggs are deposited upon and between the first set of discs 121, the bolt 125 attaching the rod 126 to the pulley 129 will be sliding in the slot 128 so that the gear rack 124 and the rollers 121 will be stationary. This gives the operator an opportunity to view the eggs in one stationary position. Further rotation of the cam shaft 102 operates to move the gear rack 124 so as to rotate the gears 122 and therefore also the disc rollers 121 with the result that while the candling rack 60 is out of engagement, the eggs will be turned through a predetermined angle. When the cam shaft has completed a portion of a revolution, the gear rack 124 will again become stationary so that the operator will be able to view the eggs from a different angle while the shells are stationary and the shell contents rotate within the shells and before they are picked up by the second set of recesses 77 in the candling rack 60 to be moved upwardly, forwardly and downwardly to be deposited upon and between the second set of disc rollers 121. The cycle is repeated for each egg until it is either deposited by the last pair of recesses 77 upon the track 150, or removed from the candling rack 60 by the operator. The level of delivery section C is somewhat below that of the rack 60 so that extensions 71 move over the track spacers 157 when the rack 60 moves to its forwardmost position.

It is to be understood that although the invention has been described specifically as it may be applied to the candling of eggs, it is not limited to that purpose but may, with suitable alterations and modifications apparent at once to those skilled in the art upon reading the description, be employed to inspect any article that can be graded by shining light through it. It is also to be understood that the invention includes all modifications and changes that will occur to those skilled in the art. Thus, for example, the cams 101 and 111 may be designed to move eggs over several sets of rollers in one movement to increase the capacity of the machine. The invention is therefore intended to include all such modifications and alterations as come within the scope of the appended claims.

I claim:

1. An egg candling machine including a feed section and a candling section wherein the candling section comprises a source of light, means for directing light upwardly from said source to a viewing position, rotatable means anterior and posterior of said viewing position for supporting an egg, means for intermittently rotating said egg supporting means, a conveyor having first and second recesses for the reception of eggs therein, means for moving said conveyor successively upwardly, forwardly, downwardly and rearwardly, whereby said first recess lifts an egg to be candled off the feed section, advances it to a position over the egg supporting means and deposits the egg upon said supporting means during the upward, forward, and downward movements, respectively, of the conveyor and said second recess lifts a candled egg from the egg supporting means and advances it during the upward and forward movements, respectively, of the conveyor, and means for actuating the movements of the conveyor and the rotation of the egg supporting means in timed relation to rotate the egg supporting means after an egg is deposited upon and before it is removed from the supporting means.

2. An inspection device having a feed section and a viewing section, said feed section comprising a pair of inclined tracks, a belt running between said pair of tracks, means for varying the angle of inclination of said tracks, and said viewing section comprising a light source, a shield positioned above said light source, said shield having a focusing tube, a shaft, a set of rollers carried by said shaft, means for rotating intermittently said rollers, a rack having a plurality of recesses into which the objects to be graded fit, a plurality of supports upon which said rack is mounted and means for imparting horizontal and vertical motion to said supports so as to raise, move forward, lower, and move backward said rack.

3. An egg candling machine including a feed section and a candling section wherein the feed section comprises a pair of tracks inclined downwardly toward the candling section, a belt lengthwise of and between the tracks and movable away from the candling section, the level of the belt relative to the level of the track being adjusted for minimum contact with the shell of an egg having its longest axis disposed substantially horizontally and transversely of said tracks, means for intermittently and momentarily increasing the inclination of the tracks, and a plurality of obstructions spaced along at least a portion of the length of the track, and wherein the candling section comprises a source of light, means for directing light upwardly from said source to a viewing position, rotatable means anterior and posterior of said viewing position for supporting an egg, means for intermittently rotating said egg supporting means, a conveyor having first and second recesses for the reception of eggs therein, means for moving said conveyor successively upwardly, forwardly, downwardly and rearwardly, whereby said first recess lifts an egg to be candled off the tracks of the feed section, advances it to a position over the egg supporting means and deposits the egg upon said supporting means during the upward, forward, and downward movements, respectively, of the conveyor and said second recess lifts a candled egg from the egg supporting means and advances it during the upward and forward movements, respectively, of the conveyor, and means for actuating the movements of the conveyor and the rotation of the egg supporting means in timed relation to rotate the egg supporting means after an egg is deposited upon and before it is removed from the supporting means.

CHARLES K. POWELL.

REFERENCES CITED

The following references are of record in the file of this patent:

UNITED STATES PATENTS

| Number | Name | Date |
|---|---|---|
| 1,221,730 | Hatfield | Apr. 3, 1917 |
| 2,044,981 | Guttman | June 23, 1936 |
| 2,070,980 | Wyland | Feb. 16, 1937 |
| 2,190,620 | Milmoe et al. | Feb. 13, 1940 |

FOREIGN PATENTS

| Number | Country | Date |
|---|---|---|
| 339,115 | Great Britain | Dec. 4, 1930 |
| 637,956 | Germany | Nov. 6, 1936 |